(12) United States Patent
Yoon et al.

(10) Patent No.: US 9,037,778 B2
(45) Date of Patent: May 19, 2015

(54) METHOD AND APPARATUS TO INTERFACE SEMICONDUCTOR STORAGE DEVICE AND HOST TO PROVIDE PERFORMANCE THROTTLING OF SEMICONDUCTOR STORAGE DEVICE

(75) Inventors: Han Bin Yoon, Hwaseong-si (KR); Dong Gi Lee, Yongin-si (KR); Hyuck-Sun Kwon, Seoul (KR)

(73) Assignee: SAMSUNG Electronics Co., Ltd., Suwon-si (KR)

( * ) Notice: Subject to any disclaimer, the term of this patent is extended or adjusted under 35 U.S.C. 154(b) by 354 days.

(21) Appl. No.: 13/212,404

(22) Filed: Aug. 18, 2011

(65) Prior Publication Data

US 2012/0047320 A1 Feb. 23, 2012

(30) Foreign Application Priority Data

Aug. 20, 2010 (KR) .......... 10-2010-0080697
Aug. 20, 2010 (KR) .......... 10-2010-0080698
Aug. 20, 2010 (KR) .......... 10-2010-0080699
Aug. 20, 2010 (KR) .......... 10-2010-0080862

(51) Int. Cl.
*G06F 12/00* (2006.01)
*G06F 3/06* (2006.01)

(52) U.S. Cl.
CPC ............ *G06F 3/0616* (2013.01); *G06F 3/0638* (2013.01); *G06F 3/0659* (2013.01); *G06F 3/0679* (2013.01)

(58) Field of Classification Search
USPC ......................................... 711/103
See application file for complete search history.

(56) References Cited

U.S. PATENT DOCUMENTS

| 6,470,238 | B1 * | 10/2002 | Nizar et al. ................... 700/299 |
| 7,020,758 | B2 | 3/2006 | Fisk |
| 7,035,970 | B1 | 4/2006 | Zahavi |
| 7,222,216 | B2 | 5/2007 | Guha et al. |
| 2007/0260811 | A1 * | 11/2007 | Merry et al. .................. 711/103 |
| 2008/0126720 | A1 * | 5/2008 | Danilak ........................ 711/158 |
| 2008/0282030 | A1 | 11/2008 | Kalwitz et al. |
| 2009/0132778 | A1 * | 5/2009 | Danilak ........................ 711/167 |
| 2009/0138671 | A1 * | 5/2009 | Danilak ........................ 711/170 |
| 2009/0300277 | A1 * | 12/2009 | Jeddeloh ....................... 711/104 |
| 2010/0077096 | A1 * | 3/2010 | Philip et al. ................... 709/233 |

* cited by examiner

*Primary Examiner* — Aimee Li
*Assistant Examiner* — Prasith Thammavong
(74) *Attorney, Agent, or Firm* — Ellsworth IP Group PLLC

(57) ABSTRACT

A method and apparatus to interface a semiconductor storage device and a host in order to provide performance throttling of the semiconductor storage device. In the method, the semiconductor storage can receive a setting request command from the host. The semiconductor storage device sets a performance throttling parameter to a particular value in response to the setting request command. The semiconductor storage device can send to the host a setting response signal indicating completion of the setting of the performance throttling parameter.

15 Claims, 18 Drawing Sheets

FIG. 8

| PERFORMANCE THROTTLING FLAG |
| --- |
| THROTTLED PERFORMANCE (OR THROTTLED PERFORMANCE LEVEL) |
| TYPE OF COMMAND (E.G., WRITE OR READ COMMAND) SUBJECTED TO PERFORMANCE THROTTLING |
| DURATION (OR STEP) OF IDLE TIME |
| MINIMUM PERFORMANCE (OR MINIMUM PERFORMANCE LEVEL) |
| MAXIMUM PERFORMANCE (OR MAXIMUM PERFORMANCE LEVEL) |
| INITIAL PERFORMANCE (OR INITIAL PERFORMANCE LEVEL) |
| PERFORMANCE THROTTLING PERIOD |
| SINGLE PERFORMANCE THROTTLING VARIATION (OR VARIATION LEVEL COUNT) |
| VIRTUAL WORKLOAD HISTORY |

FIG. 9

| HOST COMMAND COUNT |
| --- |
| HOST WRITE COMMAND COUNT |
| HOST READ COMMAND COUNT |
| HOST COMMAND SECTOR COUNT |
| HOST COMMAND SECTOR COUNT |
| HOST WRITE COMMAND SECTOR COUNT |
| HOST READ COMMAND SECTOR COUNT |
| DEVICE PROGRAM OPERATION COUNT |
| DEVICE READ OPERATION COUNT |

FIG. 10

| Name | Description | |
|---|---|---|
| Feature | 1 | |
| Count | Bit  Description<br>7:1  N/A<br>0 | |
| LBA | N/A | |
| Device | Bit  Description<br>7    Obsolete<br>6    Shall be set to one<br>5    Obsolete<br>4    Transport Dependent<br>3:0  Reserved | |
| Command | 7:0 | |

FIG. 11A

| Name | Description | |
|---|---|---|
| Feature | 1 | |
| Count | Bit | Description |
| | 7:1 | N/A |
| | 0 | 1 for THROTTLING ENABLE, 0 for THROTTLING DISABLE |
| LBA | N/A | |
| Device | Bit | Description |
| | 7 | Obsolete |
| | 6 | Shall be set to one |
| | 5 | Obsolete |
| | 4 | Transport Dependent |
| | 3:0 | Reserved |
| Command | 7:0 | FAh |

FIG. 11B

| Name | Value |
|---|---|
| Feature | 2 |
| Count | 1 (TO RECEIVE DATA OF 1 SECTOR FROM SSD) |
| LBA | Reserved |
| Device | Reserved |
| Command | 0xFA (THROTTLING INFORMATION REPORT COMMAND) |

FIG. 12

| Name | Value |
|---|---|
| Feature | Reserved |
| Count | Reserved |
| LBA | Reserved |
| Device | Reserved |
| Command | Reserved |

| Data (1 Sector = 512 Byte) |
|---|
| THROTTLING INFORMATION 1 |
| THROTTLING INFORMATION 2 |
| : : |

METHOD AND APPARATUS TO INTERFACE SEMICONDUCTOR STORAGE DEVICE AND HOST TO PROVIDE PERFORMANCE THROTTLING OF SEMICONDUCTOR STORAGE DEVICE

CROSS-REFERENCE TO RELATED APPLICATIONS

This application claims the benefit of priority under 35 U.S.C. §119(a) to Korean Patent Application No. 10-2010-0080862, filed on Aug. 20, 2010, to Korean Patent Application No. 10-2010-0080697, filed on Aug. 20, 2010, from to Korean Patent Application No. 10-2010-0080698, filed on Aug. 20, 2010, and to Korean Patent Application No. 10-2010-0080699, filed on Aug. 20, 2010, in the Korean Intellectual Property Office, the disclosures of which are hereby incorporated herein in their entirety by reference.

BACKGROUND OF THE INVENTION

1. Field of the Invention

The present inventive concept relates to interfacing between a data storage device and a host, and more particularly, to a method and apparatus to interface a host and a semiconductor storage device which stores data in non-volatile memory to throttle the performance of the semiconductor storage device.

2. Description of the Related Art

Semiconductor storage devices, which store data using a semiconductor device, especially, a non-volatile memory device, are advantageous in that they are fast, robust to physical shock, generate a small amount of heat or noise during operation, and can be miniaturized as compared to disk storage media, i.e., hard disk drives that have been widely used as large-capacity storage devices.

Meanwhile, semiconductor storage devices may have a limited life. A NAND flash memory device is a typical example. For instance, a NAND flash memory device is divided into blocks each of which includes a plurality of pages. When a NAND flash memory device is used, a block is erased and then the pages in the block are sequentially programmed with data. To program, with new data, the block in which all pages have been previously programmed, the block must be erased again. Such a procedure is referred to as a program and erase (PE) cycle. In a NAND flash memory device, the number of PE cycles that a block can endure is limited, which is referred to as the "endurance" of the NAND flash memory device.

When the number of PE cycles experienced by a block exceeds an endurance limit, the block is more likely to begin operating in error afterwards. Besides program and erase operations, read operations and spontaneous charge loss may cause memory to operate in error. When the probability of an erroneous operation increases, semiconductor storage devices should no longer be used for data integrity. Therefore, semiconductor storage devices using a NAND flash memory device have a limit to the life.

In the above example, when excessive workloads, for example, write operations, erase operations, and read operations, are put on semiconductor storage devices, the life thereof may be shortened or the expected life may not be ensured. To increase the expected life of semiconductor storage devices, therefore, it is necessary to throttle the processing performance of semiconductor storage devices according to the intensity or amount of workloads put thereon.

For instance, recently a solid state drive (SSD) has been developed including a multi-level cell (MLC) NAND flash memory for server applications. Such server-bound storage devices require high performance, i.e., high input/output (I/O) per second and have a wide fluctuation of workloads. When MLC NAND flash memory with an endurance limit is used in these applications, it is difficult to guarantee the life of an SSD.

A storage device whose life needs to be guaranteed is not restricted to a server-bound storage device. The lives of storage devices to be used in personal computers (PCs), notebook computers, mobile terminals, and so on also need to be ensured.

Besides NAND flash memory, phase-change random access memory (PRAM), magnetic RAM (MRAM), resistive RAM (ReRAM), and ferroelectric RAM (FeRAM) are also examples of memory with an endurance limit. NAND flash memory with an endurance limit include NAND flash memory using a floating gate and NAND flash memory using charge trap flash (CTF).

As described above, an approach for increasing the life of a semiconductor storage device using a non-volatile memory with an endurance limit, or ensuring the expected life thereof, is desired.

SUMMARY OF THE INVENTION

Some embodiments of the present inventive concept provide a method and apparatus to interface a host and a semiconductor storage device to throttle the performance of the semiconductor storage device.

Additional features and utilities of the present general inventive concept will be set forth in part in the description which follows and, in part, will be obvious from the description, or may be learned by practice of the general inventive concept.

According to some embodiments of the present inventive concept, there is provided a method of interfacing a semiconductor storage device and a host to provide performance throttling of the semiconductor storage device. In the method, the semiconductor storage device receives a setting request command from the host. The semiconductor storage device sets a performance throttling parameter to a particular value in response to the setting request command. The semiconductor storage device sends to the host a setting response signal indicating completion of the setting of the performance throttling parameter.

According to other embodiments of the present inventive concept, there is provided a method of interfacing a semiconductor storage device and a host to provide performance throttling of the semiconductor storage device. In the method, the host sends a setting request command to the semiconductor storage device to set a performance throttling parameter necessary for the performance throttling of the semiconductor storage device to a particular value. The host receives from the semiconductor storage device a setting response signal indicating that the performance throttling parameter has been set to the particular value.

According to further embodiments of the present inventive concept, there is provided a method of interfacing a semiconductor storage device and a host to provide performance throttling of the semiconductor storage device. In the method, the semiconductor storage device receives an information request command from the host. The semiconductor storage device sends to the host an information response signal including a performance throttling parameter in response to the information request command.

According to other embodiments of the present inventive concept, there is provided a method of interfacing a semiconductor storage device and a host to provide performance throttling of the semiconductor storage device. In the method, the host sends to the semiconductor storage device an information request command which requests transmission of a performance throttling parameter of the semiconductor storage device. The host receives from the semiconductor storage device an information response signal including a value of the performance throttling parameter sent in response to the information request command.

According to further embodiments of the present inventive concept, there is provided a recording medium to record a program to execute the method.

According to further embodiments of the present inventive concept, there is provided an apparatus including a non-volatile memory device and a controller configured to control the non-volatile memory device according to a request from a host.

The controller receives a setting request command from the host, sets a performance throttling parameter to a particular value in response to the setting request command, and sends to the host a setting response signal indicating completion of the setting of the performance throttling parameter.

According to further embodiments of the present inventive concept, there is provided an interfacing apparatus including a central processing unit (CPU) and an interface unit configured to send a setting request command to a semiconductor storage device to set a performance throttling parameter necessary for the performance throttling of the semiconductor storage device to a particular value according to a control of the host, and to receive from the semiconductor storage device a setting response signal indicating that the performance throttling parameter has been set to the particular value.

According to further embodiments of the present inventive concept, there is provided an interfacing apparatus including a non-volatile memory device and a controller configured to control the non-volatile memory device according to a request from a host. The controller receives an information request command from the host, and sends to the host an information response signal comprising a performance throttling parameter in response to the information request command.

According to further embodiments of the present inventive concept, there is provided an interfacing apparatus including a central processing unit (CPU) and an interface unit configured to send to a semiconductor storage device an information request command which requests transmission of a performance throttling parameter of the semiconductor storage device, and to receive from the semiconductor storage device an information response signal comprising a value of the performance throttling parameter sent in response to the information request command.

According to further embodiments of the present inventive concept, there is provided a non-transient computer readable storage medium containing codes to perform a method of interfacing with a semiconductor storage device, the method comprising providing an interface protocol to communicate with the semiconductor storage device, sending a setting request command to perform performance throttling of the semiconductor storage device through the interface protocol, and receiving a setting response signal from the semiconductor storage device.

In an embodiment, the setting request command includes a particular value for a corresponding performance throttling parameter of the semiconductor storage device.

In an embodiment, the setting request command includes at least one command among a performance throttling enable/disable command, a throttled performance set command, a command to set a type of command subjected to performance throttling, a command to set a duration of idle time inserted for performance throttling, a minimum performance set command, a maximum performance set command, an initial performance set command, a performance throttling period set command, a performance throttling variation set command, a performance throttling reset command, a performance throttling check point set command, and a virtual workload history set command.

In an embodiment, the setting request command comprises a feature field, a count field, a logic block address field, a device field, and a command field.

BRIEF DESCRIPTION OF THE DRAWINGS

The above and other features and utilities of the present inventive concept will become more apparent by describing in detail exemplary embodiments thereof with reference to the attached drawings in which:

FIG. 8 shows performance throttling parameters stored in a semiconductor storage device to throttle the performance of the semiconductor storage device according to some embodiments of the present inventive concept;

FIG. 9 shows workload parameters used to estimate a workload of a semiconductor storage device according to some embodiments of the present;

FIG. 10 is a table showing the format of a setting request command according to some embodiments of the present inventive concept;

FIGS. 11A and 11B are tables showing the format of a performance throttling enable command and the format of an information request command, respectively, according to some embodiments of the present;

FIG. 12 is a table showing the format of an information response command according to some embodiments of the present inventive concept;

DETAILED DESCRIPTION OF THE PREFERRED EMBODIMENTS

Figure 1:
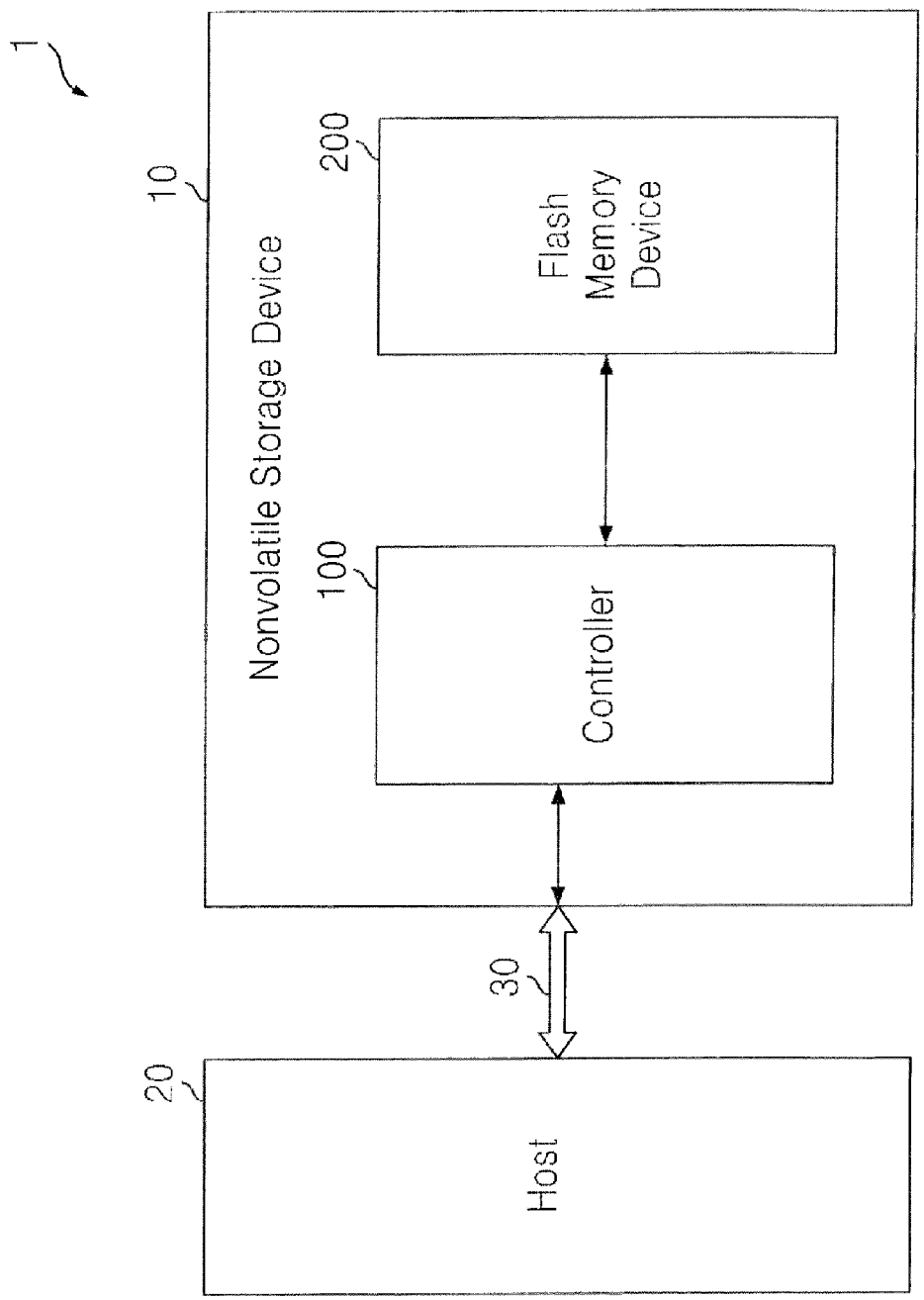
FIG. 1 is a schematic block diagram of a data storage system according to some embodiments of the present inventive concept.

The present inventive concept now will be described more fully hereinafter with reference to the accompanying drawings, in which embodiments of the inventive concept are shown. This inventive concept may, however, be embodied in many different forms and should not be construed as limited to the embodiments set forth herein. Rather, these embodiments are provided so that this disclosure will be thorough and complete, and will fully convey the scope of the inventive concept to those skilled in the art. In the drawings, the size and relative sizes of layers and regions may be exaggerated for clarity. Like numbers refer to like elements throughout.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein, the term "and/or" includes any and all combinations of one or more of the associated listed items and may be abbreviated as "/".

It will be understood that, although the terms first, second, etc may be used herein to describe various elements, these elements should not be limited by these terms. These terms are only used to distinguish one element from another. For example, a first signal could be termed a second signal, and, similarly, a second signal could be termed a first signal without departing from the teachings of the disclosure.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

Embodiments of the present inventive concept relate to a method of analyzing and estimating a workload (i.e., the intensity and the pattern of the workload) to be put on a semiconductor storage device before throttling the performance of the semiconductor storage device. The optimum performance of the storage device can only be deduced based on the intensity and the pattern of the workload, with respect to a lifespan and an endurance limit which should be guaranteed for the storage device.

FIG. 1 is a schematic block diagram of a data storage system 1 according to some embodiments of the present inventive concept. The data storage system 1 may include a semiconductor storage device 10 and a host 20. The semiconductor storage device 10 may include a controller 100 and a non-volatile memory device, such as, for example, a flash memory device 200.

The host 20 may communicate with the semiconductor storage device 10 using an interface protocol such as Peripheral Component Interconnect Express (PCI-E), Advanced Technology Attachment (ATA), Serial ATA (SATA), Parallel ATA (PATA), or Serial Attached SCSI Small Computer System Interface (SCSI) (SAS). However, the interface protocol between the host 20 and the semiconductor storage device 10 is not restricted to the above examples, and may be a universal serial bus (USB) protocol, a multi-media card (MMC) protocol, enhanced small disk interface (ESDI) or an integrated drive electronics (IDE) protocol.

The semiconductor storage device 10 may be a solid state drive (SSD) or a secure digital (SD) card, but the present inventive concept is not restricted thereto. The non-volatile memory device 200 may be a flash memory device, but the present inventive concept is not restricted thereto. The non-volatile memory device 200 may be a phase-change random access memory (PRAM) device, a magnetic RAM (MRAM) device, a resistive RAM (ReRAM) device, or a ferroelectric RAM (FeRAM) device. When the non-volatile memory device 200 is a flash memory device, it may be a NAND flash memory device using a floating gate or charge trap flash (CTF). Memory cell transistors included in the non-volatile memory device 200 may be arranged in two dimensions or in three dimensions.

The controller 100 controls the overall operation of the semiconductor storage device 10 and controls all data exchange between the host 20 and the non-volatile memory device 200. For instance, the controller 100 controls the non-volatile memory device 200 to write or read data at the request of the host 20. Also, the controller 100 controls internal operations, such as performance throttling, merging, and wear-leveling, necessary for the characteristics or the efficient management of the non-volatile memory device 200.

The non-volatile memory device 200 is a storage device to store data in a non-volatile state. It may store an operating system (OS), various programs, and diverse data.

Figure 2:
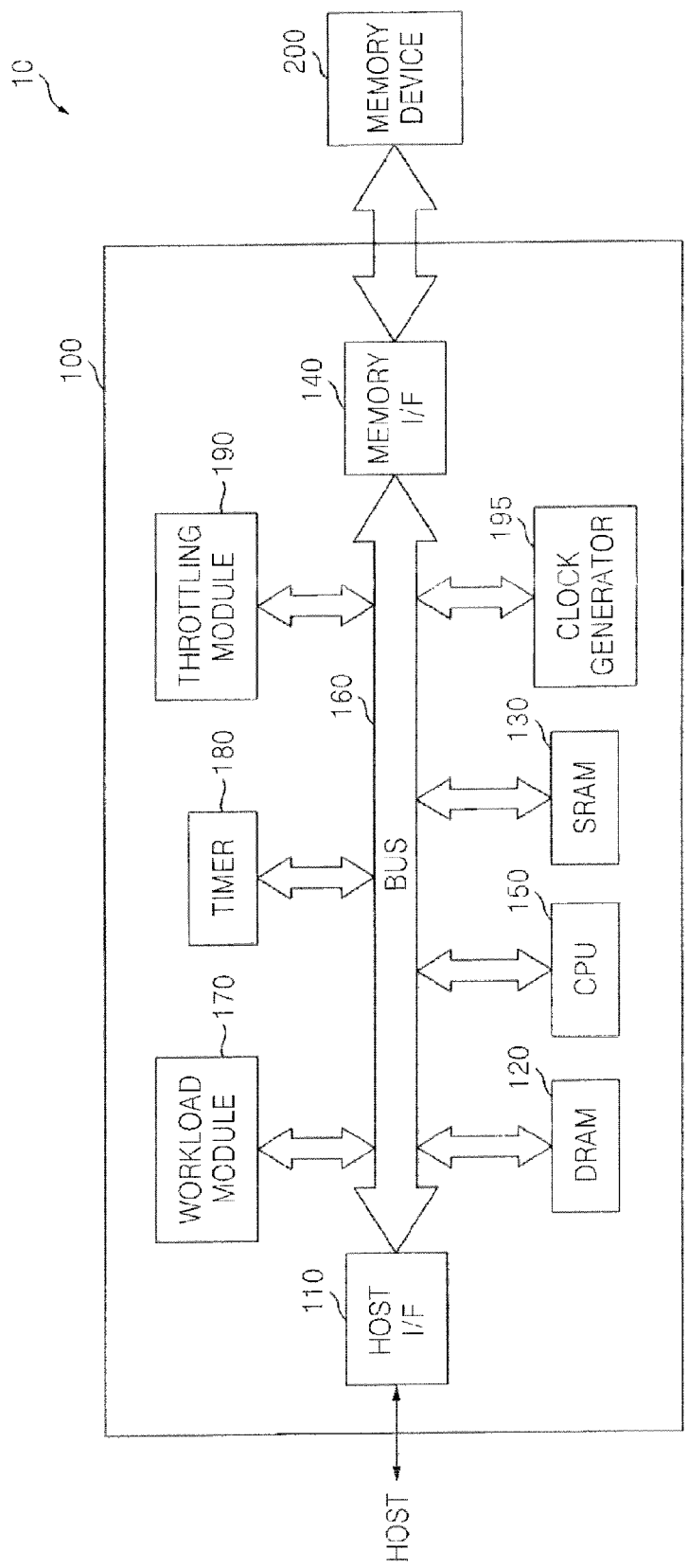
FIG. 2 is a schematic block diagram of a controller according to some embodiments of the present inventive concept.

FIG. 2 is a schematic block diagram of the controller 100 according to some embodiments of the present inventive concept. The controller 100 may include a host interface (I/F) 110, a dynamic Random-Access Memory (RAM) (DRAM) 120, a static RAM (SRAM) 130, a memory interface (I/F) 140, a central processing unit (CPU) 150, a bus 160, a workload module 170, a timer 180, a throttling module 190, and a clock generator 195.

The host I/F 110 is equipped with one of the interface protocols described above to communicate with the host 20. The DRAM 120 and the SRAM 130 store data and/or programs in a volatile state. The memory I/F 140 interfaces with the non-volatile memory device 200. The CPU 150 performs an overall control operation to write data to and/or read data from the non-volatile memory device 200. The workload module 170 gathers workload data related with workload put on the semiconductor storage device 10 and estimates the workload based on the gathered workload data. The throttling module 190 determines a target performance level according to the workload estimated by the workload module 170 and can throttle the performance of the semiconductor storage device 10 based on the determined target performance level. The timer 180 provides time information to the CPU 150, the workload module 170, and the throttling module 190.

The workload module 170, the timer 180, and the throttling module 190 may be implemented in hardware, software, or combination thereof. When the workload module 170, the timer 180, and the throttling module 190 are implemented in software, a relevant program may be stored in the non-volatile memory device 200 and it may be loaded to the SRAM 130 and executed by the CPU 150 when the semiconductor storage device 10 is powered on.

The clock generator 195 generates a clock signal necessary for the operation of each of the CPU 150, the DRAM 120, and the non-volatile memory device 200 and provides it to each element. The clock signals respectively provided to the CPU 150, the DRAM 120, and the non-volatile memory device 200 may have different speeds. The clock generator 195 may control the speed of a clock signal applied to each of the CPU 150, the DRAM 120, and the non-volatile memory device 200 according to the performance level determined by the throttling module 190, so that the performance of the semiconductor storage device 10 can be throttled.

Although not shown, the semiconductor storage device 10 may also include other elements such as a read-only memory (ROM), which stores code data executed when the semiconductor storage device 10 is powered on, and an error correction code (ECC) engine, which encodes data to be stored in the non-volatile memory device 200 and decodes data read from the non-volatile memory device 200.

Figure 3:
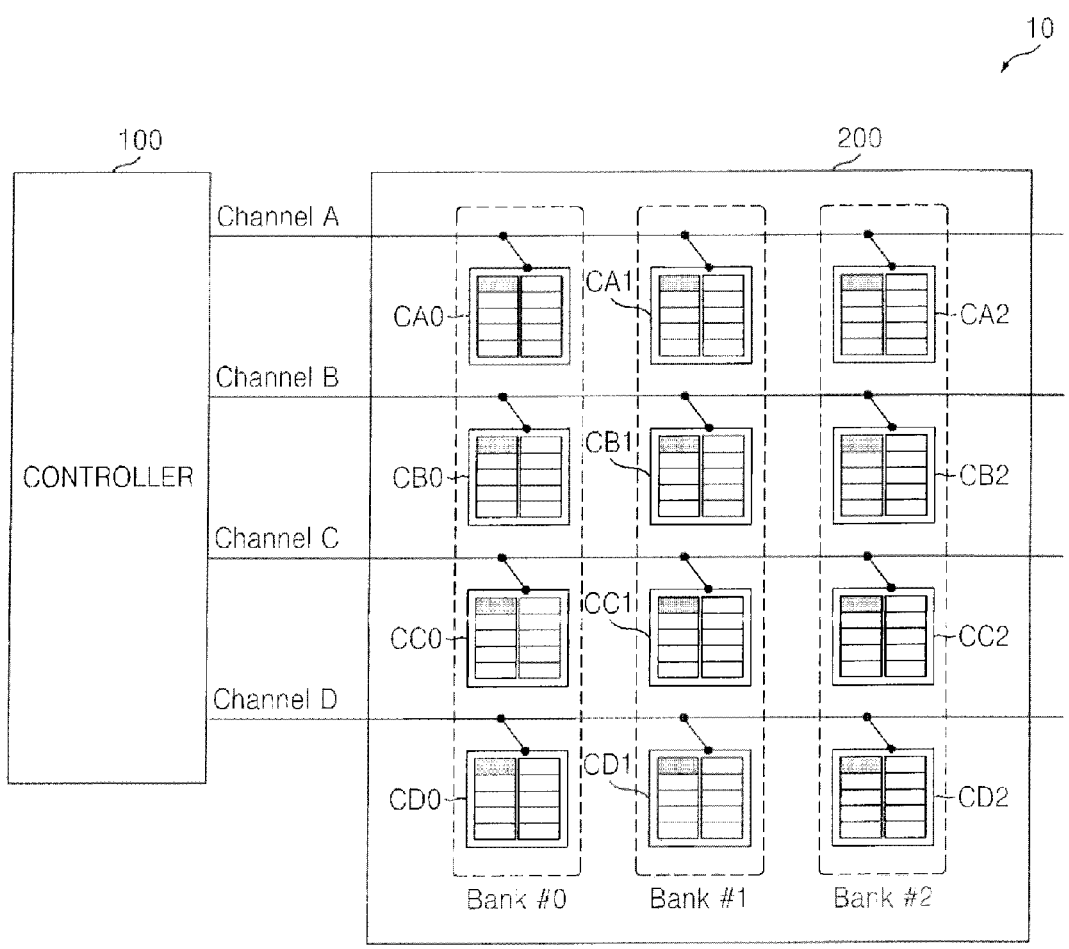
FIG. 3 is a diagram showing the schematic structure of a non-volatile memory device illustrated in FIG. 2.

FIG. 3 is a diagram showing the schematic structure of the non-volatile memory device 200 illustrated in FIG. 2. The non-volatile memory device 200 may include a plurality of memory elements. The non-volatile memory device 200 illustrated in FIG. 3 has the hardware structure of 4 channels and 3 banks, but the present inventive concept is not restricted thereto.

In the semiconductor storage device 10 illustrated in FIG. 3, the controller 100 is connected with the non-volatile memory device 200 through four channels A, B, C, and D each of which is connected to three flash memory elements CA0 through CA2, CB0 through CB2, CC0 through CC2, or CD0 through CD2, respectively. It is apparent that the numbers of channels and banks are not restricted to the current embodiments, but may be changed. In such a structure, the performance of the semiconductor storage device 10 may be throttled by the entire non-volatile memory device 200, by buses or channels shared by memory elements or chips, by banks, or by individual memory elements. Here, a bank is a group of memory elements positioned at the same offset on different channels.

Figure 4:
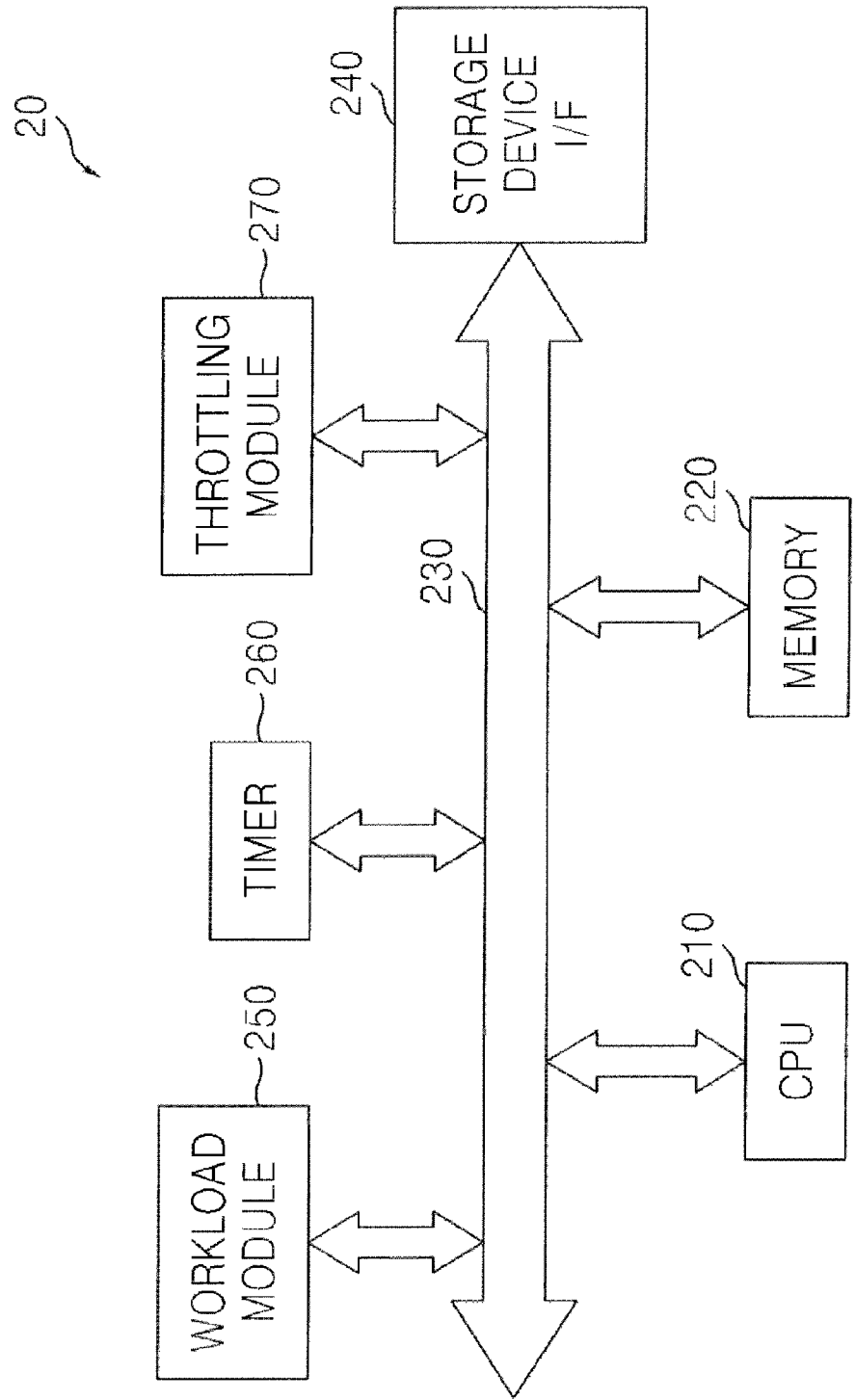
FIG. 4 is a schematic block diagram of a host according to some embodiments of the present inventive concept.

FIG. 4 is a schematic block diagram of the host 20 according to some embodiments of the present inventive concept. The host 20 may include a CPU 210, a memory 220, a bus 230, a storage device I/F 240, a workload module 250, a timer 260, and a throttling module 270.

The storage device I/F 240 is equipped with an interface protocol to communicate with the semiconductor storage device 10. The CPU 210 performs an overall control operation to write data to and/or read data from the semiconductor storage device 10. The workload module 250 may gather workload data related with a workload put on the semiconductor storage device 10 and estimate the workload based on the gathered workload data. The throttling module 270 determines a target performance level according to the workload estimated by the workload module 250 and throttles the performance of the semiconductor storage device 10 based on the determined performance level. The timer 260 provides time information to the CPU 210, the workload module 250, and the throttling module 270.

The workload module 250, the timer 260, and the throttling module 270 may be implemented in hardware, software, or combination thereof. The workload module 250 and the throttling module 270 are provided so that the host 20 can throttle or control the performance of the semiconductor storage device 10. When the semiconductor storage device 10 throttles the performance by itself without intervention of the host 20, the host 20 may not include the workload module 250 and the throttling module 270.

Figure 5:
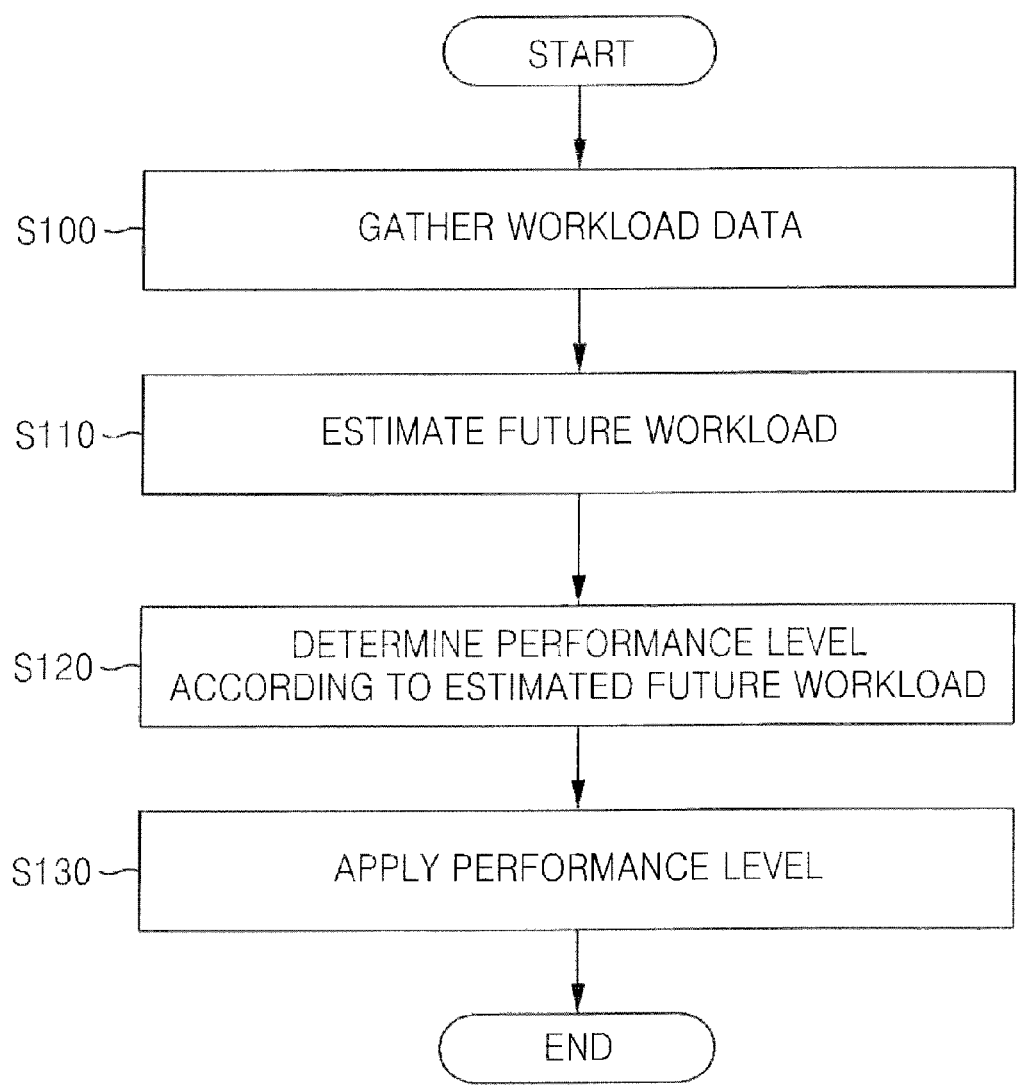
FIG. 5 is a flowchart of a method of operating a semiconductor storage device according to some embodiments of the present inventive concept.

FIG. 5 is a flowchart of a method of operating the semiconductor storage device 10 according to some embodiments of the present inventive concept. The method may be implemented in the semiconductor storage device 10 or the host 20 or distributively implemented in both the semiconductor storage device 10 and the host 20. In the embodiments of the present inventive concept, the method is implemented in the semiconductor storage device 10, but the present inventive concept is not restricted to these embodiments.

Referring to FIG. 5, the controller 100 gathers workload data related with a workload put on the semiconductor storage device 10 in operation S100 and estimates the workload based on the workload data in operation S110. The controller 100 determines a target performance level according to the estimated workload in operation S120 and applies the performance level to the operation of the semiconductor storage device 10 in operation S130.

U.S. patent application Ser. No. 13/166,257, which corresponds to Korean Patent Application No. 10-2010-0080697, which is incorporated in its entirety herein by reference, is referred to for the method of operations S100 and S110 of gathering the workload data related with the workload applied to the semiconductor storage device 10 and estimating the workload based on the collected workload data. U.S. patent application Ser. No. 13/166,131, which corresponds to Korean Patent Application No. 10-2010-0080699, which is incorporated in its entirety herein by reference, is referred to for the method of operation S120 of determining the target performance level according to the estimated workload. U.S. patent application Ser. No. 13/166,216, which corresponds to Korean Patent Application No. 10-2010-0080699, which is incorporated in its entirety herein by reference, is referred to for the method of operation S130 of applying the performance level to the operation of the semiconductor storage device 10.

To manifest the above-described performance throttling method, a protocol relating to performance throttling between the host 20 and the semiconductor storage device 10 is required. In other words, a protocol for the transfer of commands and information related with the to performance throttling between the host 20 and the semiconductor storage device 10 is required.

Figure 6:
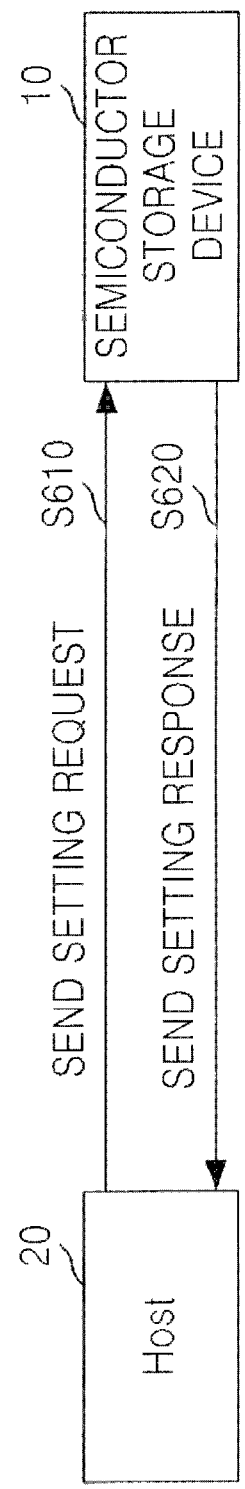
FIG. 6 is a schematic flowchart of a method of interfacing a host and a semiconductor storage device for throttling the performance of the semiconductor storage device according to some embodiments of the present inventive concept.

FIG. 6 is a schematic flowchart of a method of interfacing the host 20 and the semiconductor storage device 10 to throttle the performance of the semiconductor storage device according to some embodiments of the present inventive concept. Referring to FIG. 6, the host 20 sends a setting request command for performance throttling to the semiconductor storage device 10 in operation S610. Upon receiving the setting request command from the host 20, the semiconductor storage device 10 sets or stores a particular value included in the command for a corresponding performance throttling parameter of the semiconductor storage device 10 and performs an operation based on the set value of the parameter. After the completion of the operation, the semiconductor storage device 10 sends a setting response signal to the host 20 in operation S620.

The setting request command may include a performance throttling enable/disable command, a throttled performance (or performance level) set command, a command to set a type of command (e.g., write command or read command) subjected to throttling, a command to set a duration (or step) of idle time inserted for performance throttling, a minimum performance (or minimum performance level) set command, a maximum performance (or maximum performance level) set command, an initial performance (or initial performance level) set command, a performance throttling period set command, a performance throttling variation (or variation level count) set command, a performance throttling reset command, a performance throttling check point set command, and a virtual workload history set command. The semiconductor storage device 10 stores in a memory or a register a set value included in the setting request command received from the host 20.

FIG. 8 shows performance throttling parameters stored in the semiconductor storage device 10 to throttle the performance of the semiconductor storage device 10 according to some embodiments of the present inventive concept. The performance throttling parameters shown in FIG. 8 may be set in the semiconductor storage device 10 in response to the setting request command from the host 20 (see FIG. 6). It is apparent that the performance throttling parameters may be alternatively set through a different way from the setting request command from the host 20.

The performance throttling enable/disable command is a command to enable or disable the performance throttling function of the semiconductor storage device 10. When the host 20 sends the performance throttling enable command to the semiconductor storage device 10 to enable the performance throttling of the semiconductor storage device 10, the semiconductor storage device 10 may set a performance throttling flag (for example, to "1") as indicated in FIG. 8 in response to the performance throttling enable command and may send the setting response signal to the host 20. When the host 20 sends the performance throttling disable command to the semiconductor storage device 10 to disable the performance throttling of the semiconductor storage device 10, the semiconductor storage device 10 may reset the performance throttling flag (for example, to "0") as indicted in FIG. 8 in response to the performance throttling disable command and may send the setting response signal to the host 20.

The throttled performance (or performance level) set command is a command to inform the semiconductor storage device 10 of a performance throttled by the host 20 when the host 20 throttles the performance of the semiconductor storage device 10. In response to the throttled performance (or performance level) set command, the semiconductor storage device 10 may set a corresponding performance throttling parameter (i.e., the performance of the semiconductor storage device 10) to a value included in the command.

The command for setting a type of command (e.g., write command or read command) is to set a type of performance to be throttled in the semiconductor storage device 10. For instance, either or both of read performance and write performance of the semiconductor storage device 10 may be throttled. The host 20 may decide the type of command to be subjected to performance throttling and inform the semiconductor storage device 10 of the type of command.

The duration (or step) of idle time indicates the length or step of the idle time inserted into the period of operation of the semiconductor storage device 10 to throttle the performance of the semiconductor storage device 10. The idle time may be inserted using the timer 180 or by performing a meaningless operation (e.g., a "no operation" (NOP)). The timer 180 may be implemented in hardware or software.

To effectively and definitely throttle the performance of the semiconductor storage device 10, the idle time may be added to a unit operation of the semiconductor storage device 10. For instance, a predetermined idle time or an idle time proportional to the amount of processed data may be generated at the occurrence of each of a program operation to the non-volatile memory device 200, a read operation from the non-volatile memory device 200, a read/write operation from/to an internal buffer (e.g., a page buffer) of the non-volatile memory device 200, a read/write operation from/to a buffer (e.g., the DRAM 120 or the SRAM 130) of the controller 100, and a host I/F read/write operation. The duration (or step) of the idle time may be determined by the semiconductor storage device 10 and reported to the host 20, or may be determined by the host 20 and reported to the semiconductor storage device 10.

The minimum performance (or minimum performance level) set command, the maximum performance (or maximum performance level) set command, and the initial performance (or initial performance level) set command are commands for the host 20 to set the minimum performance, the maximum performance, and the initial performance, respectively, of the semiconductor storage device 10. The initial performance of the semiconductor storage device 10 is applied to an initial operation period (e.g., a predetermined period from the moment of power-on) of the semiconductor storage device 10. The minimum performance and the maximum performance are the lowest limit and the highest limit, respectively, of performance that can be throttled in the semiconductor storage device 10. The maximum performance, the minimum performance, and the initial performance of the semiconductor storage device 10 may be set in advance in the semiconductor storage device 10, or may be set by a command of the host 20.

The performance throttling period set command is a command to set a performance throttling period. Upon receiving the performance throttling period set command from the host 20, the semiconductor storage device 10 sets the performance throttling period to a value included in the command. Thereafter, the semiconductor storage device 10 may calculate a new performance level at each performance throttling period and apply the new performance level. At this time, the new performance level may be held for the performance throttling period and when a single performance throttling period expires, the performance level may be newly calculated and applied. Here, the performance throttling period may be set in units of hours, days, weeks, or months, but is not restricted thereto. In addition, the performance throttling period may or may not coincide with a performance estimating period. For instance, performance estimation may be carried out in units of hours and performance throttling may be carried out in units of days or vice versa.

The performance throttling variation (or variation level count) set command is a command to set a performance throttling variation. The performance throttling variation is set to put a limit to the difference between a newly throttled performance (i.e., a new performance) and a performance before that throttling (i.e., a previous performance). The performance throttling variation may be expressed as an absolute value, a percentage of a previous performance, a percentage of a maximum performance, or a discrete level count.

When the performance throttling variation is set as the percentage of the previous performance or the maximum performance, the host 20 or the semiconductor storage device 10 throttles the performance of the semiconductor storage device 10 so that the difference between the newly throttled performance and the previous performance or the maximum performance is maintained within a variation (+/−x % where "x" is, for example, 10, 20 or 5%). The discrete level count indicates the number of levels or steps by which the performance can be throttled when the performance is expressed using a plurality of discrete levels or steps. For instance, when the performance throttling variation is set to a discrete level count of 2, the discrete level of the throttled performance (i.e., a performance to be newly applied) is decided within two levels from a previous discrete level used before throttling.

The virtual workload history set command is a command by which the host 20 sets a virtual workload history instead of setting the initial performance level in the semiconductor storage device 10. To set the virtual workload history is to set parameters corresponding to a virtual workload to particular values on the presumption that the semiconductor storage device 10 underwent the virtual workload for a predetermined period of time before being powered on.

Figure 7:
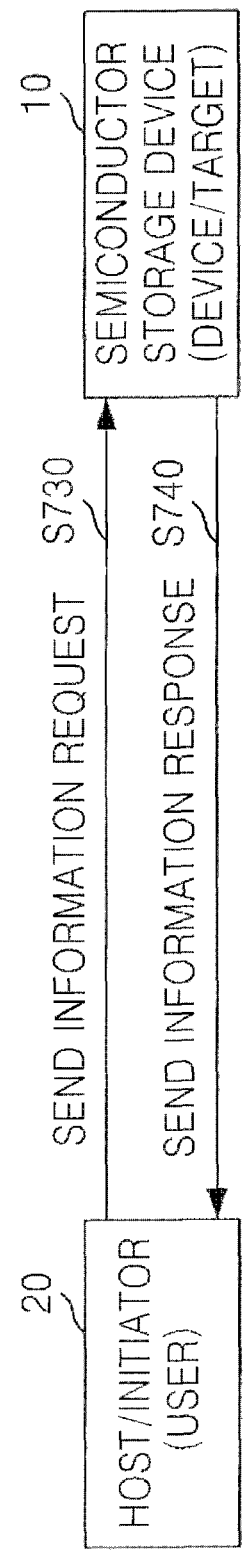
FIG. 7 is a schematic flowchart of a method of interfacing a host and a semiconductor storage device to throttle the performance of the semiconductor storage device according to other embodiments of the present inventive concept.

FIG. 7 is a schematic flowchart of a method of interfacing the host 20 and the semiconductor storage device 10 to throttle the performance of the semiconductor storage device 10 according to other embodiments of the present inventive concept. Referring to FIG. 7, the host 20 may send an information request command to the semiconductor storage device 10 in operation S710. Upon receiving the information request command from the host 20, the semiconductor storage device 10 sends performance throttling information to the host 20 in operation S720. The semiconductor storage device 10 may send the performance throttling information through an information response signal.

The performance throttling information may be the performance throttling parameters stored in a memory or a register of the semiconductor storage device 10. The performance throttling parameters have been described with reference to FIG. 8 above.

The performance throttling information may also include workload data shown in FIG. 9. The workload data is gathered to estimate a workload and may be the value of a workload parameter counted during a predetermined period. As illustrated in FIG. 9, the workload parameter may include at least one among the number of commands that the host 20 applies to the semiconductor storage device 10, the number of write commands that the host 20 applies to the semiconductor storage device 10, the number of read commands that the host 20 applies to the semiconductor storage device 10, the amount of data transferred to/from the host 20 in response to a command, the amount of data received from the host 20 in response to write commands, the amount of data transferred to the host 20 in response to read commands, the number of program operations performed in the semiconductor storage device 10, and the number of read operations performed in the semiconductor storage device 10.

Performance throttling parameter values sent from the host 20 to the semiconductor storage device 10 and set in the semiconductor storage device 10 for performance throttling may be transferred to the semiconductor storage device 10 through respective commands. Alternatively, at least two performance throttling parameter values may be transferred to the semiconductor storage device 10 through a single command. Similarly, performance throttling information items may be sent individually or in bulk from the semiconductor storage device 10 to the host 20.

FIG. 10 is a table showing the format of the setting request command according to some embodiments of the present inventive concept. The host 20 sends to the semiconductor storage device 10 the setting request command that includes a feature field, a count field, a logic block address (LBA) field, a device field, and a command field, as illustrated in FIG. 10, to set the performance throttling parameters of the semiconductor storage device 10. Each field included in the command may comprise a predetermined number of bits. For instance, the command field, the device field, and the count field may comprise 8 bits.

The command field may be used to identify the type of the setting request command. At least one among the feature field, the count field, and the LBA field may be set as a performance throttling parameter value.

FIGS. 11A and 11B are tables showing the format of the performance throttling enable command and the format of the information request command, respectively, according to some embodiments of the present inventive concept. In the performance throttling enable command illustrated in FIG. 11A, the command field is set to a predetermined value, e.g., FAh; the feature field is set to "1"; and the least significant bit (LSB) of the count field is set to "1" or "0".

When the LSB of the count field is set to "1", a current command may become a performance throttling enable command. When the LSB of the count field is set to "0", a current command may become a performance throttling disable command. The semiconductor storage device 10 may set the performance throttling flag shown in FIG. 8 in response to the performance throttling enable command and may reset the performance throttling flag in response to the performance throttling disable command. Thereafter, the semiconductor storage device 10 may send a performance throttling enable/disable response signal to the host 20.

In the information request command shown in FIG. 11B, the command field is set to a predetermined value, e.g., 0xFA; the feature field is set to "2"; and the count field is set to "1". The count field is a value for defining the amount of performance throttling information to be received from the semiconductor storage device 10. Accordingly, in response to the information request command in which the count field is set to "1", the semiconductor storage device 10 sends one sector of performance throttling information to the host 20.

FIG. 12 is a table showing the format of the information response command according to some embodiments of the present inventive concept. The host 20 may send the information request command in a format similar to the format shown in FIG. 10 to the semiconductor storage device 10. Then, the semiconductor storage device 10 may send a performance throttling parameter value or workload data to the host 20 through the information response command in a format shown in FIG. 12. Similarly in the case of the information or setting request command, the information response command may include a response signal including a feature field, a count field, an LBA field, a device field, and a command field and information data (e.g., one sector of information data) transmitted following the response signal.

Figure 13:
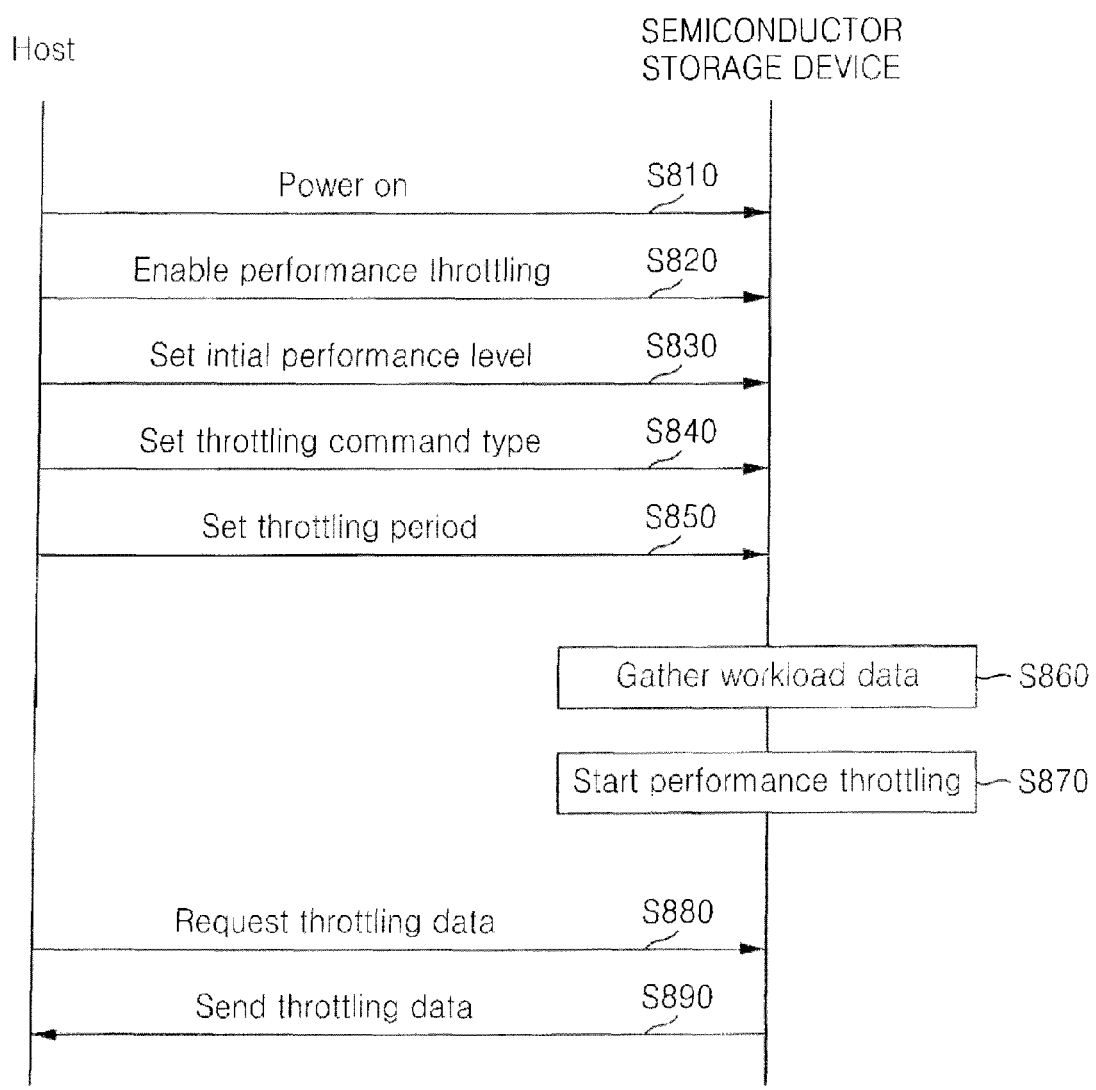
FIG. 13 is a detailed flowchart of a method of interfacing a host and a semiconductor storage device according to some embodiments of the present inventive concept.

FIG. 13 is a detailed flowchart of a method of interfacing the host 20 and the semiconductor storage device 10 according to some embodiments of the present inventive concept. Referring to FIG. 13, when the semiconductor storage device 10 is powered on in operation S810, the host 20 enables performance throttling of the semiconductor storage device 10 through a command in operation S820. In other words, the host 20 sends a performance throttling enable command to the semiconductor storage device 10 to enable the performance throttling of the semiconductor storage device 10.

Next, the host 20 sets various performance throttling parameters (e.g., an initial performance level, a type of command subjected to performance throttling, i.e., a throttling command type, and a performance throttling period) necessary for the performance throttling of the semiconductor storage device 10 in operations S830 through S850. After the performance throttling parameters are set, the semiconductor storage device 10 gathers workload data in operation S860. The semiconductor storage device 10 starts performance throttling once sufficient workload data for the performance throttling has been gathered in operation S870.

In other embodiments of the present inventive concept, the workload data of the semiconductor storage device 10 may be gathered by the host 20 unlike the method illustrated in FIG. 13, where the workload data is illustrated as being gathered by the semiconductor storage device 10. In other words, the host 20 may gather workload data and start the performance throttling based on the gathered workload data from the host 20. When a new performance level is determined based on the gathered workload data, the host 20 may set a throttled performance in the semiconductor storage device 10 through a command. Alternatively, the host 20 may determine an idle time based on the new performance level and set the determined idle time in the semiconductor storage device 10 through a command. Then, the semiconductor storage device 10 can throttle the performance based on the set performance or the idle time.

The host 20 sends an information request command to the semiconductor storage device 10 to obtain performance throttling information in operation S880. Then, the semiconductor storage device 10 sends to the host 20 an information response signal including the performance throttling information in operation S890.

Figure 14:
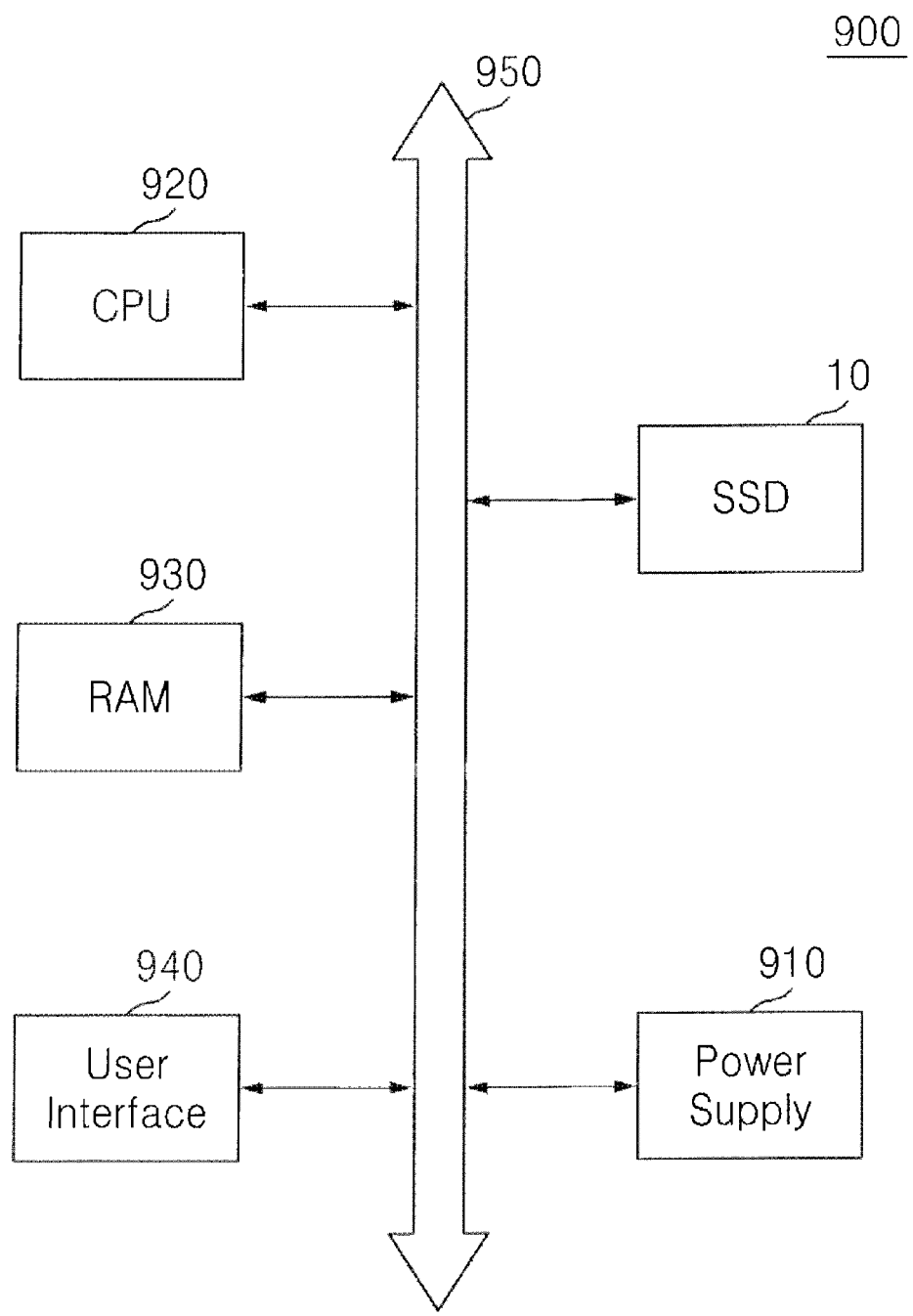
FIG. 14 is a block diagram of an electronic system according to some embodiments of the present inventive concept.

FIG. 14 is a block diagram of an electronic system according to some embodiments of the present inventive concept.

Referring to FIG. 14, the electronic system 900 according to the present exemplary embodiment may include a semiconductor storage device 10, a power supply 910, a central processing unit (CPU) 920, a RAM 930, a user interface 940, and a system bus 950 electrically connecting these elements.

The CPU 920 controls the overall operation of the electronic system 900. The RAM 930 stores information needed for the operation of the electronic system 900. The user interface 940 provides an interface between the electronic system 900 and a user. The power supply 910 supplies electric power to the internal constituent elements such as the CPU 920, the RAM 930, the user interface 940, and the semiconductor storage device 10.

The CPU 920 may correspond to the host 20, and the semiconductor storage device 10 may store or read data in response to a command from the host 20. The semiconductor storage device 10 according to an exemplary embodiment of the present inventive concept is as described above. A detailed description thereof will be thus omitted.

Figure 15A:
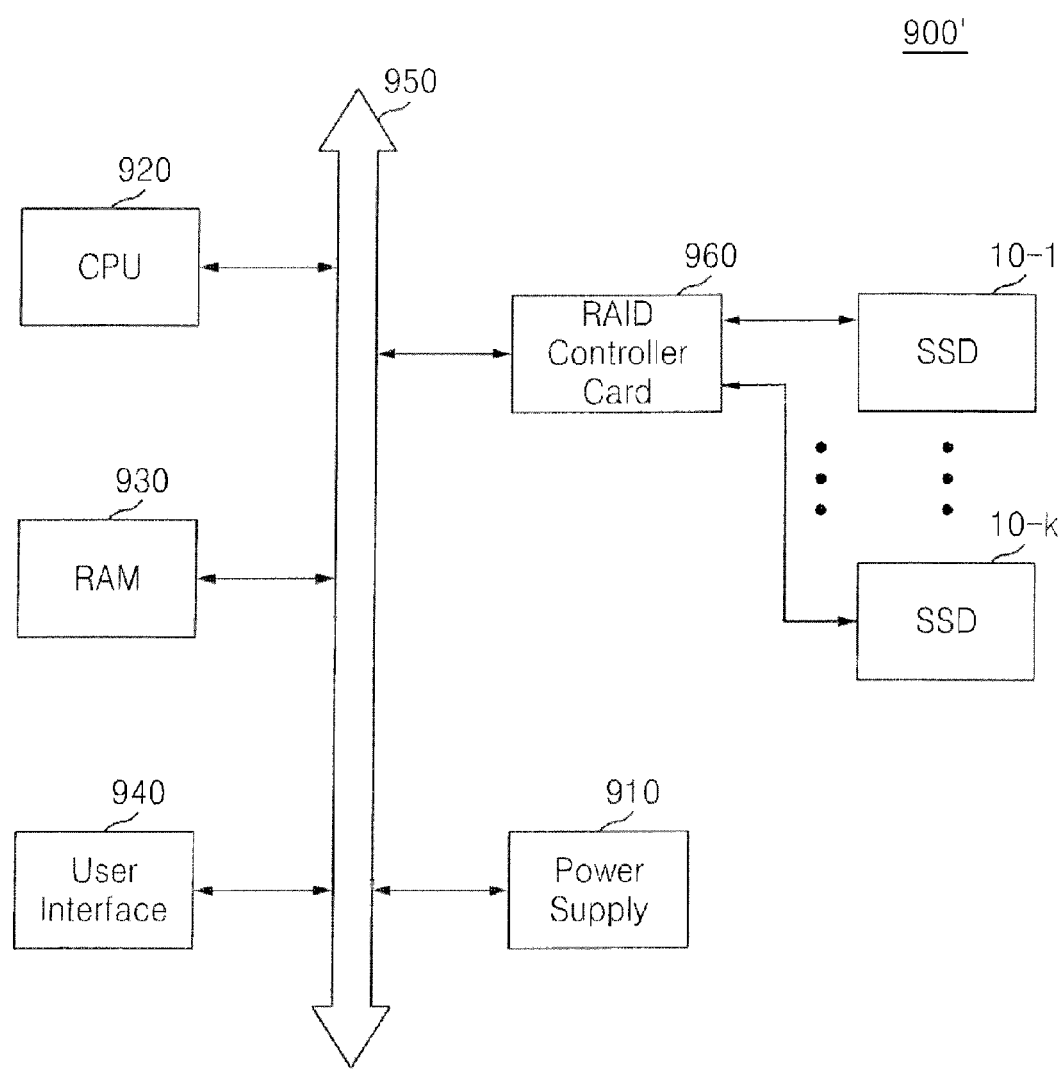
FIGS. 15A and 15B are block diagrams of electronic systems according to some embodiments of the present inventive concept, respectively.
Figure 15B:
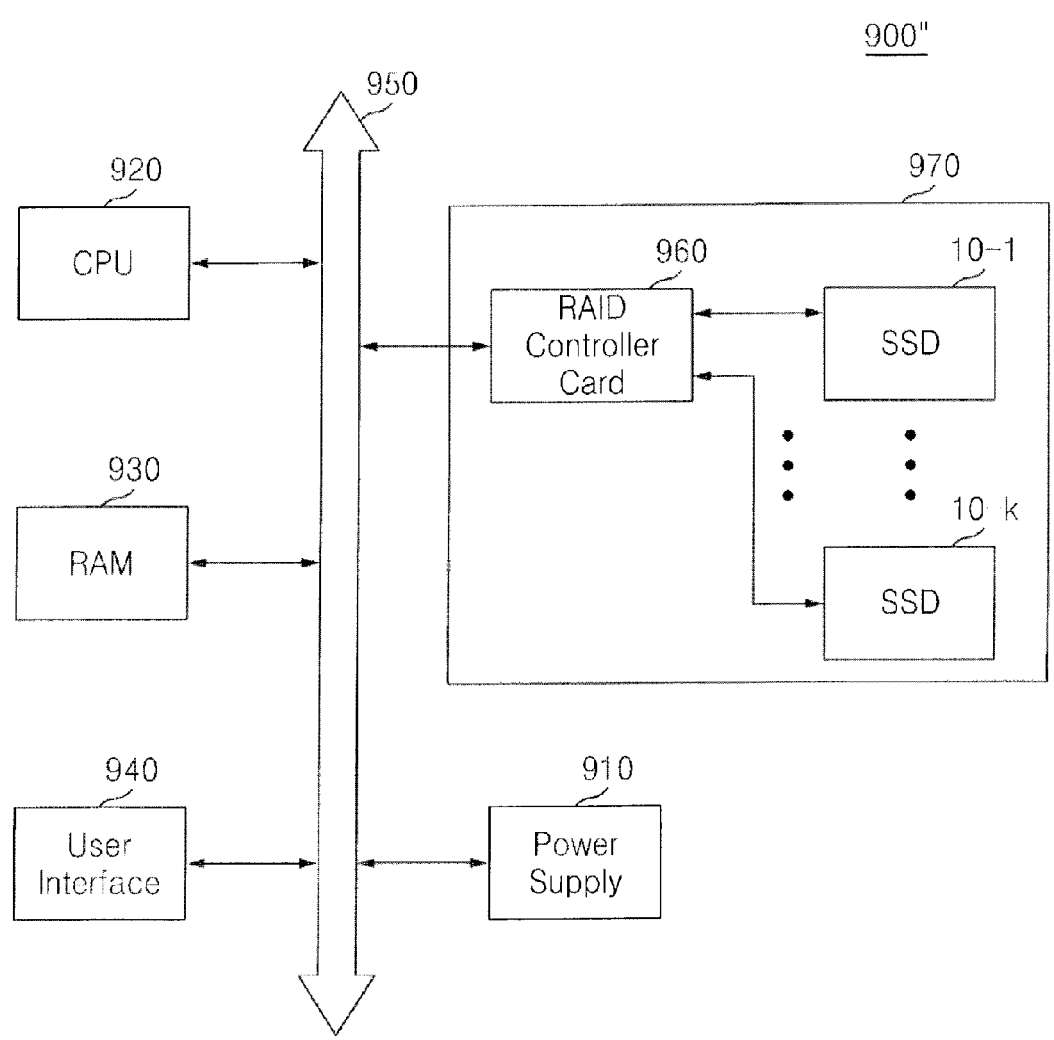

FIGS. 15A and 15B are block diagrams of electronic systems according to some embodiments of the present inventive concept, respectively.

The electronic system as illustrated in FIG. 15A has a similar configuration to the electronic system as illustrated in FIG. 14, so only differences there-between will be described in order to avoid a repeated description.

The electronic system as illustrated in FIG. 15A further includes a Redundant Array of Independent Disks (RAID) controller card 960 as compared with the electronic system as illustrated in FIG. 14. The RAID controller card 960 is connected between the host 20 and the semiconductor storage device 10 to control the semiconductor storage device 10 in compliance with the host 20. In an alternative embodiment, as illustrated in FIG. 15B, the semiconductor storage device 10 is installed into a RAID enclosure device 970 together with the RAID controller card 960 and communicates with the host 20 via the RAID controller card 960.

Figure 16:
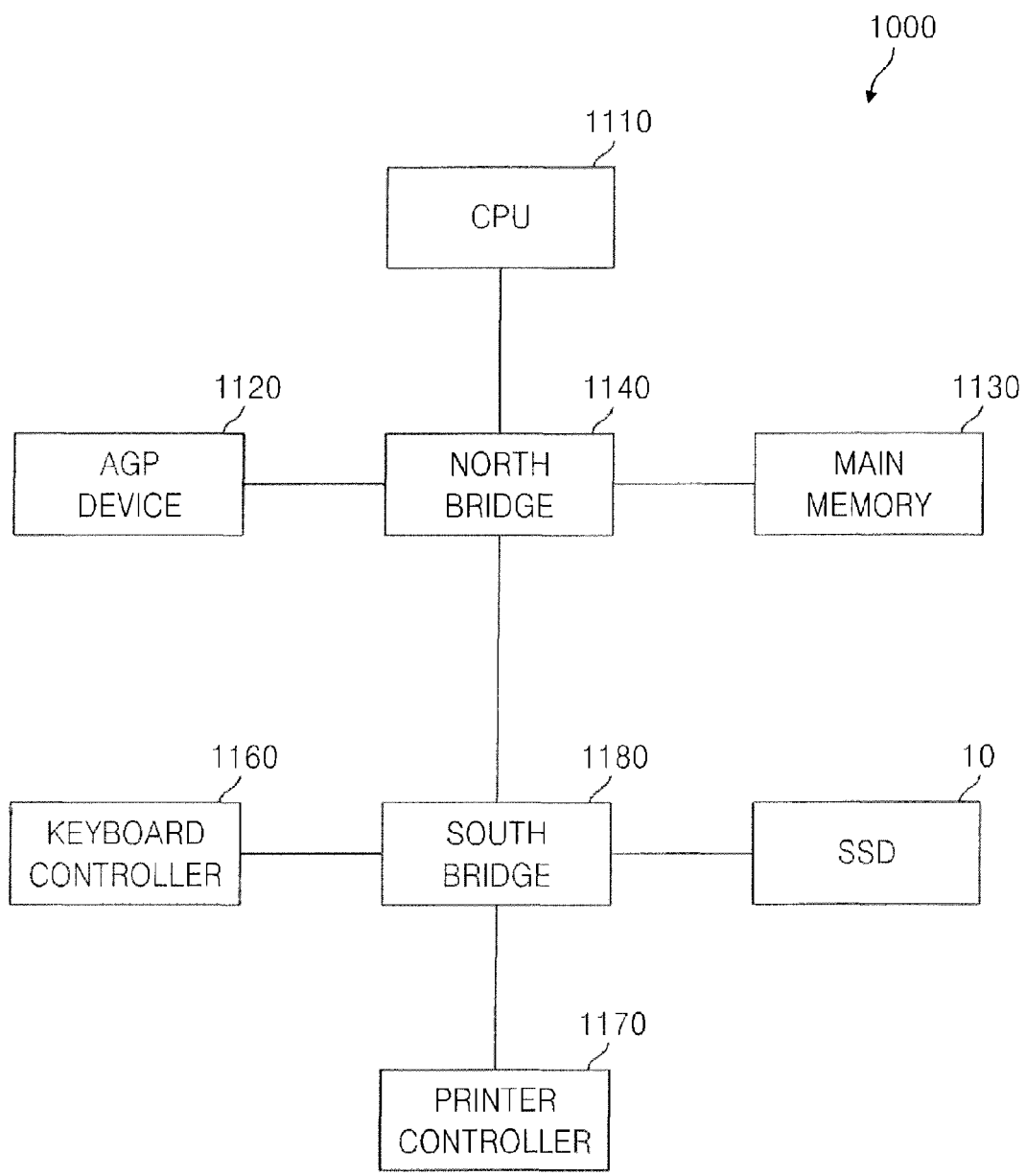
FIG. 16 shows a block diagram of a computer system having the semiconductor storage device of FIG. 1, according to an example embodiment of the present inventive concept.

FIG. 16 shows a block diagram of a computer system 1000 having a solid state drive (SSD) implemented as the semiconductor storage device 10 of FIG. 1. The computer system 1000 includes a computer central processing unit (CPU) 1110, and includes an accelerated graphics port (AGP) device 1120 and a main memory 1130 coupled to the computer CPU 1110 via a north bridge 1140. The computer system 1000 further includes a keyboard controller 1160, a printer controller 1170, and the SSD 10 coupled to the computer CPU 1110 via a south bridge 1180 and the north bridge 1140. The components 1110, 1120, 1130, 1140, 1160, 1170, and 1180 of the computer system 1000 are generally and individually known to one of ordinary skill in the art. The computer system 1000 may be a personal computer (PC) system or a notebook computer in which the SSD is used as a main storage device instead of a hard disk drive. However, the present inventive concept is not restricted thereto.

The present general inventive concept can also be embodied as computer-readable codes on a computer-readable medium. The computer-readable medium can include a computer-readable recording medium and a computer-readable transmission medium. The computer-readable recording medium is any data storage device that can store data as a program which can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network coupled computer systems so that the computer-readable code is stored and executed in a distributed fashion. The computer-readable transmission medium can be transmitted through carrier waves or signals (e.g., wired or wireless data transmission through the Internet). Also, functional programs, codes, and code segments to accomplish the present general inventive concept can be easily construed by programmers skilled in the art to which the present general inventive concept pertains.

As described above, according to some embodiments of the present inventive concept, various parameters necessary for performance throttling of a semiconductor storage device 10 are easily set through requests or commands generated by a host 20 and information about the performance throttling is reported to the host 20 by the semiconductor storage device 10.

While the present inventive concept has been particularly shown and described with reference to exemplary embodiments thereof, it will be understood by those of ordinary skill in the art that various changes in forms and details may be made therein without departing from the spirit and scope of the present inventive concept as defined by the following claims.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A method of interfacing a semiconductor storage device and a host to provide performance throttling of the semiconductor storage device, the method comprising:

receiving at the semiconductor storage device a setting request command from the host, the setting request command comprising a feature field, a count field, a logic block address field, and a command field, the command field being set to a predetermined value to identify a type of the setting request command, and at least one among the feature field, the count field, and the logic block address field being set to the particular value of the performance throttling parameter;

setting a performance throttling parameter to a particular value at the semiconductor storage device in response to the received setting request command; and sending to the host by the semiconductor storage device, before a start of the performance throttling, a setting response signal indicating completion of the setting of the performance throttling parameter.

2. The method of claim 1, wherein the setting request command comprises at least one command among a performance throttling enable/disable command, a throttled performance set command, a command for setting a type of command subjected to performance throttling, a command for setting a duration of idle time inserted for performance throttling, a minimum performance set command, a maximum performance set command, an initial performance set command, a performance throttling period set command, a performance throttling variation set command, a performance throttling reset command, a performance throttling check point set command, and a virtual workload history set command.

3. The method of claim 2, wherein the semiconductor storage device comprises a memory or a register configured to store the performance throttling parameter.

4. The method of claim 2, wherein the performance throttling variation set command is a command which puts a limit to a difference between a newly throttled performance and a previous performance.

5. The method of claim 2, wherein the virtual workload history set command is a command which sets a virtual workload history instead of setting an initial performance level in the semiconductor storage device.

6. The method of claim 2, wherein the command for setting the duration of idle time is configured to set an idle time proportional to an amount of processed data.

7. The method of claim 2, wherein the performance throttling variation set command is configured to set a performance throttling variation to one of an absolute value, a percentage of a previous performance, a percentage of a maximum performance, and a discrete level count.

8. The method of claim 1, wherein if a least significant bit of the count field is set to a first value the setting request command is a performance throttling enable command and if the least significant bit of the count field is set to a second value the setting request command is a performance throttling disable command.

9. A method of interfacing a semiconductor storage device and a host to provide performance throttling of the semiconductor storage device, the method comprising:

sending a setting request command by the host to the semiconductor storage device to set a performance throttling parameter necessary to perform the performance throttling of the semiconductor storage device to a particular value, the setting request command comprising a feature field, a count field, a logic block address field, and a command field, the command field being set to a predetermined value to identify a type of the setting request command, and at least one among the feature field, the count field, and the logic block address field being set to the particular value of the performance throttling parameter; and receiving from the semiconductor storage device at the host, before a start of the performance throttling, a setting response signal indicating that the performance throttling parameter has been set to the particular value.

10. A method of interfacing a semiconductor storage device and a host to provide performance throttling of the semiconductor storage device, the method comprising:

receiving, after a start of the performance throttling, an information request command from the host at the semiconductor storage device, the information request command comprising a feature field, a count field, a logic block address field, and a command field, the command field being set to a predetermined value to identify a type of the information request command, and at least one among the feature field, the count field, and the logic block address field being set to the particular value of the performance throttling parameter; and sending from the semiconductor storage device to the host an information response signal comprising a performance throttling parameter in response to the information request command.

11. The method of claim 10, wherein the performance throttling parameter comprises at least one among a throttled performance, a type of command subjected to performance throttling, a duration of an idle time inserted for performance throttling, and a workload parameter count.

12. The method of claim 11, wherein the semiconductor storage device comprises a memory or a register configured to store the performance throttling parameter.

13. A method of interfacing a semiconductor storage device and a host to provide performance throttling of the semiconductor storage device, the method comprising:

sending, after a start of the performance throttling, from the host to the semiconductor storage device an information request command which requests transmission of a performance throttling parameter of the semiconductor storage device, the information request command comprising a feature field, a count field, a logic block address field, and a command field, the command field being set to a predetermined value to identify a type of the information request command, and at least one among the feature field, the count field, and the logic block address field being set to the particular value of the performance throttling parameter; and receiving at the host an information response signal comprising a value of the performance throttling parameter sent in response to the information request command from the semiconductor storage device.

14. A non-transitory computer readable storage medium containing codes to perform a method of interfacing with a semiconductor storage device, the method comprising:

providing an interface protocol to communicate with the semiconductor storage device;

sending a setting request command to perform performance throttling of the semiconductor storage device through the interface protocol, the setting request command comprising a feature field, a count field, a logic block address field, and a command field, the command field being set to a predetermined value to identify a type of the setting request command, and at least one among the feature field, the count field, and the logic block address field being set to the particular value of the performance throttling parameter; and receiving, before a start of the performance throttling, a setting response signal from the semiconductor storage device.

15. The non-transitory computer readable storage medium of claim 14, wherein the setting request command includes at least one command among a performance throttling enable/disable command, a throttled performance set command, a command to set a type of command subjected to performance throttling, a command to set a duration of idle time inserted for performance throttling, a minimum performance set command, a maximum performance set command, an initial performance set command, a performance throttling period set command, a performance throttling variation set command, a performance throttling reset command, a performance throttling check point set command, and a virtual workload history set command.

\* \* \* \* \*